April 26, 1960 C. S. MORSER 2,934,309
FLOATING SEAT BUTTERFLY VALVE
Filed Aug. 24, 1956 3 Sheets-Sheet 1

INVENTOR.
CALVIN S. MORSER
BY
ATTORNEYS

April 26, 1960   C. S. MORSER   2,934,309
FLOATING SEAT BUTTERFLY VALVE
Filed Aug. 24, 1956   3 Sheets-Sheet 3
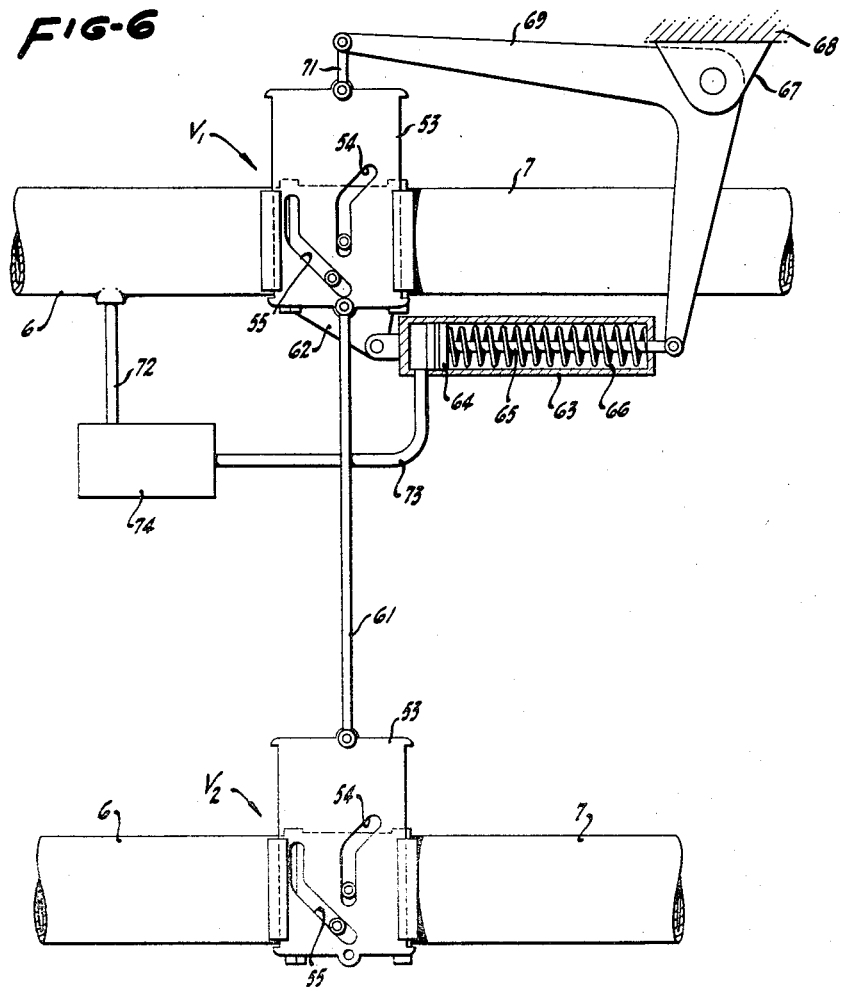
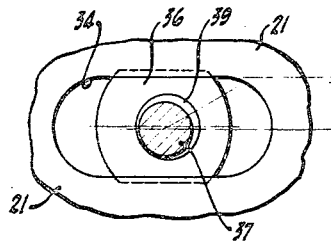
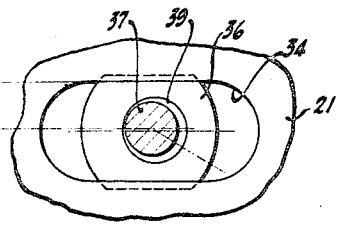
INVENTOR.
CALVIN S. MORSER
BY
ATTORNEYS

United States Patent Office 2,934,309
Patented Apr. 26, 1960

2,934,309

FLOATING SEAT BUTTERFLY VALVE

Calvin S. Morser, Palo Alto, Calif., assignor, by mesne assignments, to American Radiator & Standard Sanitary Corporation, New York, N.Y., a corporation of Delaware Application August 24, 1956, Serial No. 606,000

1 Claim. (Cl. 251—159)

This invention relates to, and in general has for its object, the provision of a butterfly valve provided with an axially movable valve seat.

More specifically, the object of this invention is the provision of a butterfly valve of the character above described provided with means for sequentially rotating its butterfly valve closure member and axially moving its valve seat.

Still another object of this invention is the provision of a valve of the character described wherein the contacting portions of the butterfly valve closure member and the valve seat lie on a common sphere having its center on the intersection of the axis of rotation of the butterfly with the axis of the valve port.

The invention possesses other advantageous features, some of which, with the foregoing, will be set forth at length in the following description where that form of the invention which has been selected for illustration in the drawings accompanying and forming a part of the present specification, is outlined in full. In said drawings one form of the invention is shown, but it is to be understood that it is not limited to such form, since the invention, as set forth in the claim, may be embodied in other forms.

Referring to the drawings:

Fig. 4 is a section taken on the section line 4—4 of Fig. 3, showing the valve seat actuating mechanism in the closed position of the valve;

Fig. 5 is a view similar to that disclosed in Fig. 4 but showing the valve seat actuating mechanism in the open position of the valve;

Fig. 6 is a diagrammatic view of a system for simultaneously operating a pair of butterfly valves of the character illustrated in Figs. 1 to 5 inclusive.

Figure 3:
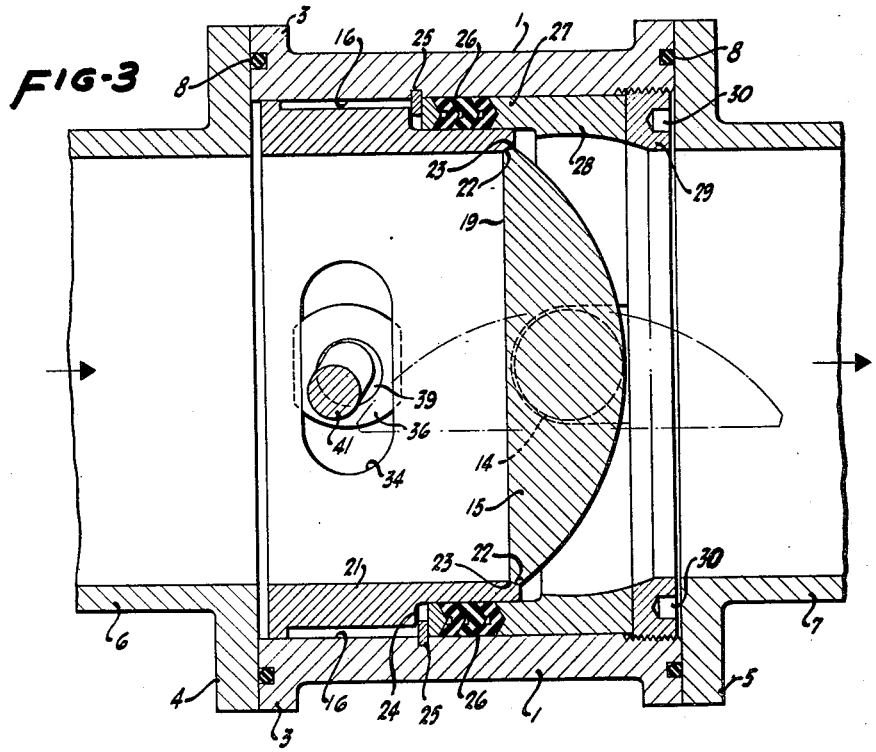
Fig. 3 is a horizontal mid-section taken on the section line 3—3 of Fig. 2.
Figure 1:
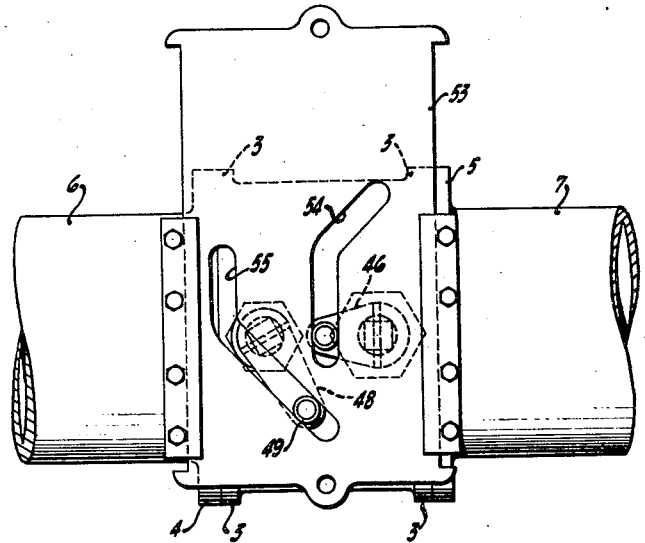
Fig. 1 is a top plan view of a valve embodying the objects of my invention.

The butterfly valve shown in these various figures comprises a valve body 1 generally rectangular in horizontal section and formed at its upper end with an enlarged slide operator head 2, also rectangular in horizontal section. As best shown in Figs. 1 and 3, the downstream and upstream ends of the valve body head 2 are provided with side flanges 3 for bolting the valve body to, or splicing it between, the flanges 4 and 5 of two spaced but axially aligned pipe sections 6 and 7, and which here serve and may be considered as a valve housing. Disposed between the pipe sections 6 and 7 and the engaging faces of the valve body are O rings 8 for effecting a water-tight seal between these members.

Figure 2:
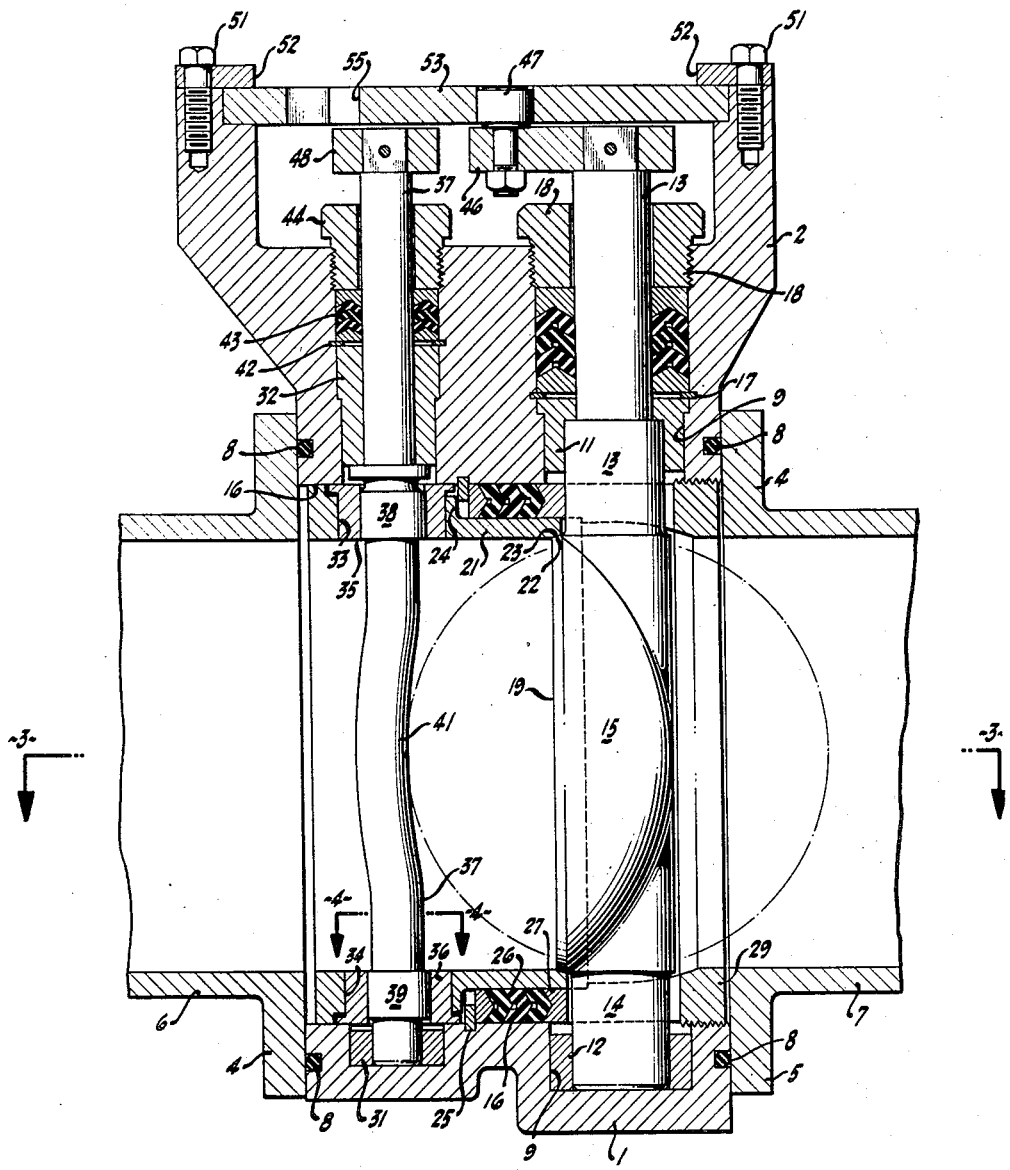
Fig. 2 is a vertical mid-section of the valve illustrated in Fig. 1.

Formed in the downstream end (righthand end as viewed in Figs. 1, 2 and 3) of the valve body 1 on the medial plane thereof is a vertical, stepped butterfly valve closure shaft bore 9, and mounted therein are vertically spaced bearing bushings 11 and 12. Journaled in the bushings 11 and 12 are the upper and lower axially aligned trunnions 13 and 14 of a lenticular butterfly valve closure member 15 formed integral and merging therewith. As shown in Figs. 2 and 3, the closure member 15 is disposed within a horizontally extending valve bore 16 formed in the valve body 1 coaxially with the pipe sections 6 and 7, but having a diameter substantially greater than the inner diameters of the pipe sections.

Disposed above the upper bushing 11 is a snap ring 17, and surrounding the trunnion 13 is a series of V packing rings held under suitable sealing compression by a gland 18 threaded within the bore 9. Here it should be noted that the face 19 of the valve closure member 15 is substantially upstream of the axis of the trunnions 13 and 14.

Seated in the bore 16 for limited longitudinal movement therein is a valve seat sleeve 21 having an internal diameter substantially equal to the internal diameters of the pipe sections 6 and 7. As best shown in Figs. 2 and 3, the inner peripheral edge of the downstream end of the sleeve 21 is formed on a radius slightly greater than the internal radius of the sleeve. The resulting arcuate shoulder serves as a seat 22 for contacting the outer peripheral edge of the butterfly valve closure member 15, said edge being formed with a complementary arcuate surface 23.

As shown in Fig. 3, the downstream end (righthand end) of the sleeve 21 is formed with a reduced outer diameter and with a shoulder 24. Seated in the valve body 1 at this point and circumscribing the sleeve 21 is a snap ring 25. Seated on the snap ring and disposed between the sleeve 21 and the valve body 1 is a series of packing rings 26. In contact with the last ring of this series is an annular gland 27 provided with forwardly extending members 28 passing around the trunnions 13 and 14. Contacting the free ends of the members 28 is an annular nut 29 threaded to the valve body 1 and for this purpose provided with spanner wrench sockets 30 (Fig. 3). By tightening the nut 29, the packing rings 26 can be compressed to any extent necessary to seal the valve body to the longitudinally movable sleeve 21.

Seated in the bottom of the valve body 1 is a bearing bushing 31, and mounted in the upper end of the valve body coaxially with the bushing 31 is a bushing 32. Formed in the top and bottom of the valve body sleeve 21 are transverse slots 33 and 34 substantially in axial alignment with the bushings 31 and 32, and seated in said slots for sliding movement therein are cam follower plates 35 and 36. Journaled in the bushings 31 and 32 is a cam shaft 37 provided with eccentrics 38 and 39 journaled respectively in the cam follower plates 35 and 36 and provided with intermediate arcuate offset portion 41 providing clearance for the butterfly valve closure 15 when the latter is in its open position as indicated in dash line in Fig. 2.

Mounted in the valve body 1 above the bushing 32 is a bushing retaining snap ring 42, and seated thereon are packing rings 43. Threaded to the valve body is a gland 44 for compressing the rings 43 to thereby effect a pressure-tight seal between the cam shaft 37 and the valve body head.

As a result of this construction, it will be seen that the rotation of the eccentrics 38 and 39 in response to the rotation of the shaft 37 within its fixed bushings 31 and 32 imparts a longitudinal component of movement to the sleeve 21, thereby bringing its downstream end (righthand end) into engagement with the arcuate edge of the butterfly valve closure member 15 when the latter is in its fully closed position as illustrated in full line in Figs. 2 and 3. Here it should be noted that to open the closure member 15 by rotating it through 90 degrees it is first necessary to back off the sleeve 21 a sufficient extent to permit the closure member to clear it.

Secured to the upper free end of the valve trunnion 13 is a crank 46, and mounted on the outer end thereof is an upwardly extending cam track follower roller 47. Similarly secured to the upper free end of the cam shaft 37 is a crank 48, and mounted on the outer end thereof is an upwardly extending cam track follower roller 49.

Fastened to the leading and trailing edges of the head 2 of the valve body 1 by bolts 51 are cleats 52, and disposed beneath said cleats for transverse sliding movement on top of the valve body head 2 is a cam track slide plate 53. Formed in the plate 53 is an offset cam track 54 for the reception of the follower roller 47 and an offset cam track 55 for the reception of the follower roller 49. Here it should be noted that the contour of the cam tracks 54 and 55 should be so correlated that when the plate 53 is pulled downwardly as viewed in Fig. 1, the crank 48 will first be constrained to rotate in a clockwise direction thereby to back-off the sleeve 21 from its forward closed position, and following this the crank 46, which in the meantime has remained stationary, is constrained to rotate counterclockwise through 90 degrees thereby to rotate the butterfly closure member 15 from its closed position to its fully open position, substantially in axial alignment with the valve port. To close the valve the reverse procedure and sequence is followed, the closure member 15 is first constrained to rotate clockwise through 90 degrees to its closed position while the sleeve remains stationary and then the sleeve 21 is constrained to advance into engagement with the arcuate peripheral edge of the closure member 15.

As a result of this construction it is possible to effect a very close fit between the closure member 15 and the sleeve 21 without in any way disturbing the normal characteristics of a butterfly valve. Only a small movement of the sleeve 21 in the upstream direction is required to provide adequate clearance to permit the closure member 15 to rotate from its closed position to its open position. By moving the sleeve 21 axially to engage the closure member 15, the power required to operate the valve is approximately 20–25% of that which would be necessary to operate a similar valve in which the butterfly closure member is moved axially in the valve bore to engage a stationary valve seat, for only the hydrostatic pressure acting on the sleeve has to be overcome rather than the pressure acting on the face of the butterfly.

As shown in Fig. 6, two or more identical valves $V_1$ and $V_2$ of the character above described can be operated in unison and in response to a predetermined differential pressure in one of the valve lines. To this end, the cam track slide plates 53 of the two valves $V_1$ and $V_2$ are connected in parallelism by a rod 61. Depending from the body of the valve $V_1$ is a bracket 62, and pivoted thereto is a cylinder 63. Slidably mounted within the cylinder 63 is a piston 64, and connected thereto is a piston rod 65. Disposed between the piston 64 and one of the end walls of the cylinder 63 is a compression spring 66 serving to bias the piston 64 to its closed position. Pivoted to a bracket 67 mounted on a stationary base or frame 68 is an L-shaped rocker arm or lever 69. One arm of said lever is fastened to the slide plate of the valve $V_1$ by a link 71 and its other arm is pivoted to the free end of the piston rod 65. Connected between the intake pipe section 6 of the valve and the cylinder 63 by lines 72 and 73 is a pressure control valve 74.

As a result of this construction, any pressure imposed on the piston 64 through the line 73 in excess of the biasing pressure of the spring 66 will serve to rotate the rocker arm 69 counterclockwise to thereby depress the slide plates of both valves $V_1$ and $V_2$ as viewed in Fig. 6. As previously explained in connection with Figs. 1 to 5 inclusive, the depression of the slide plates serves to open the valves. If the pressure in the line 73 of the valve $V_1$ drops below the biasing pressure of the spring 66, the slide plates will move upwardly toward their closed positions. By adjusting the control valve 74 the valve $V_1$ may be made to open and close at any desired line pressure and here it should be noted that this takes place regardless of the line pressure to which the valve $V_2$ may be subjected.

I claim:

A valve comprising: a valve body formed with a cylindrical bore; a circular butterfly valve closure member provided with diametrically disposed and axially aligned stub shafts journaled in said valve body; a valve closure sleeve slidably mounted within said bore, one end of said sleeve being arranged to seat against the peripheral edge of said circular butterfly valve closure member when said member is in its closed position extending transversely across said bore; a valve closure sleeve shaft journaled in said valve body and extending through said bore on a diameter thereof paralleling the axis of said stub shafts, the axis of said valve closure shaft being spaced from the axis of said stub shaft a distance at least equal to the diameter of said circular butterfly valve closure member; diametrically opposed cam bearings formed in said valve closure sleeve; circular cams eccentrically mounted on said valve closure sleeve shaft and journaled in said cam bearings; a cam plate mounted on said valve body and provided with a first cam track operatively associated with said butterfly valve closure member and with a second cam track operatively associated with said valve closure sleeve; a first crank fixed to one of said stub shafts and provided with a cam follower operating against said first cam track; a second crank fixed to one end of said valve closure sleeve shaft and provided with a cam follower operating against said second cam track, the contours of said cam tracks being such that the movement of said cam plate will cause said circular butterfly valve closure member to rotate between its open and closed positions and said sleeve to slide to and from the closed position of said closure member.

References Cited in the file of this patent

UNITED STATES PATENTS

| 1,834,870 | Rogers | Dec. 1, 1931 |
| 2,081,842 | Sharp | May 25, 1937 |
| 2,630,324 | Lay | Mar. 3, 1953 |
| 2,701,666 | Hicks | Feb. 8, 1955 |
| 2,718,372 | Broz | Sept. 20, 1955 |

FOREIGN PATENTS

| 639,043 | France | Mar. 5, 1928 |
| 146,097 | Austria | June 10, 1936 |